United States Patent [19]

de Seze et al.

[11] Patent Number: 5,535,424
[45] Date of Patent: Jul. 9, 1996

[54] METHOD ENABLING A MOBILE STATION OF A CELLULAR MOBILE RADIO SYSTEM WITH MORE THAN ONE TYPE OF CELL TO DETERMINE THE TYPE OF CELL IT IS ACCESSING, AND MOBILE STATION AND BASE TRANSCEIVER STATION FOR IMPLEMENTING THIS METHOD

[75] Inventors: Fabrice de Seze; Frédéric Gourgue, both of Paris, France

[73] Assignee: Alcatel Mobile Communication France, Paris, France

[21] Appl. No.: 303,944

[22] Filed: Sep. 9, 1994

[30] Foreign Application Priority Data

Sep. 10, 1993 [FR] France ................... 93 01788

[51] Int. Cl.⁶ ........................ H04B 7/26; H04Q 7/22
[52] U.S. Cl. .................... 455/33.1; 455/54.1; 455/56.1; 379/59
[58] Field of Search ................... 455/33.1–33.4, 455/34.2, 54.1, 54.2, 56.1, 32.1; 370/110.1, 110.4; 379/59, 60

[56] References Cited

U.S. PATENT DOCUMENTS 5,119,397   6/1992   Dahlin et al. .
5,230,081   7/1993   Yamada et al. ................. 455/33.1
5,235,632   8/1993   Raith ............................. 455/33.1
5,410,538   4/1995   Roche et al. .................... 455/33.1
5,423,063   6/1995   Goldberg ........................ 455/56.1

FOREIGN PATENT DOCUMENTS

WO9211706   7/1992   WIPO .

*Primary Examiner*—Chi H. Pham
*Attorney, Agent, or Firm*—Sughrue, Mion, Zinn, Macpeak & Seas

[57] ABSTRACT

In a method of determining, in a cellular mobile radio system with more than one type of cell, which type of cell a mobile station is accessing, the management network of the system sends to the mobile station a signalling message (recognition message) in the form of a sinusoid whose frequency (recognition frequency) differs from a reference frequency known to or determinable by the mobile station. The difference, optionally a null difference, between the reference frequency and the recognition frequency is characteristic of the cell type. The mobile station determines the recognition frequency. The mobile station then determines the difference between the reference frequency and the recognition frequency. The mobile station then determines the cell type from this difference.

20 Claims, 1 Drawing Sheet

METHOD ENABLING A MOBILE STATION OF A CELLULAR MOBILE RADIO SYSTEM WITH MORE THAN ONE TYPE OF CELL TO DETERMINE THE TYPE OF CELL IT IS ACCESSING, AND MOBILE STATION AND BASE TRANSCEIVER STATION FOR IMPLEMENTING THIS METHOD

BACKGROUND OF THE INVENTION

1. Field of the Invention

The present invention concerns a method enabling a mobile station of a cellular mobile radio system with more than one type of cell to determine the type of cell it is accessing. The invention also concerns a mobile station and a base transceiver station for implementing this method.

2. Description of the Prior Art

A cellular mobile radio system is either a simple system such as the GSM system, the DECT system, the DCS 1800 system, etc or a more complex system combining a plurality of simple systems.

In some simple cellular mobile radio systems currently at the design stage there is provision for using more than one type of cell. Each type of cell can be characterized by its own bit rate, its own modulation, its own coding, its own data packet (or burst) structure, its own baseband signal processing, etc. This applies in particular to so-called third generation systems (future mobile radio systems).

The use of different types of cells enables adaptation of the air interface between the mobile stations and the system management network to suit the location and the environment of each cell. For example, some modulation methods are more suitable than others if a mobile station is inside the building, lower bit rates are preferable in large diameter cells, and so on.

Accordingly, it is essential for a mobile station accessing a given cell, i.e. within range of the base transceiver station of the cell and able to exchange with the latter signals comprising signalling data or user data, speech or other data, to be able to determine as quickly and simply as possible which type of cell this is, in order to know its characteristics and thus to be able to exchange signals effectively.

Present day mobile radio systems include only one type of cell. The problem of determining the cell type therefore does not arise in these systems.

Evidently this facility to determine the cell type will be essential in future mobile radio systems with more than one type of cell.

Also under consideration at present is the development of mobile stations able to access different simple cellular mobile radio systems constituting a complex system, these various systems usually each using cells with different characteristics so that the complex system is one with more than one type of cell.

Mobile stations accessing such systems must also be able to determine the type of cell in which they are located.

An object of the present invention is to provide a method enabling a mobile station to determine simply and quickly the type of cell in which it is located.

SUMMARY OF THE INVENTION

To this end the present invention proposes a method of determining, in a cellular mobile radio system with more than one type of cell, which type of cell a mobile station is accessing, wherein it includes the following operations:

transmission by the management network of said system to said mobile station of a signalling message (recognition message) in the form of a sinusoid whose frequency (recognition frequency) differs from a reference frequency known to or determinable by said mobile station, the difference, optionally a null difference, between said reference frequency and said recognition frequency being characteristic of the cell type, determination by said mobile station of said recognition frequency, determination by said mobile station of the difference between said reference frequency and said recognition frequency, determination by said mobile station of the cell type from said difference.

Using this method the mobile station can determine the cell type by calculating the difference between two frequencies, this being a simple and fast operation which does not require the inclusion of any additional means in the mobile station.

To use a message in the form of a sinusoid, and in particular to determine the frequency of the sinusoid, it is not necessary for the mobile station to know the characteristics of the cell (modulation type, coding type, burst type, etc). This is highly advantageous.

According to a further feature of the invention the recognition message is contained in a frequency synchronization message sent by the network to the mobile station to enable it to synchronize its frequency to the broadcast control channel frequency of the cell it is accessing.

DETAILED DESCRIPTION OF THE PREFERRED EMBODIMENTS

Figure 1:
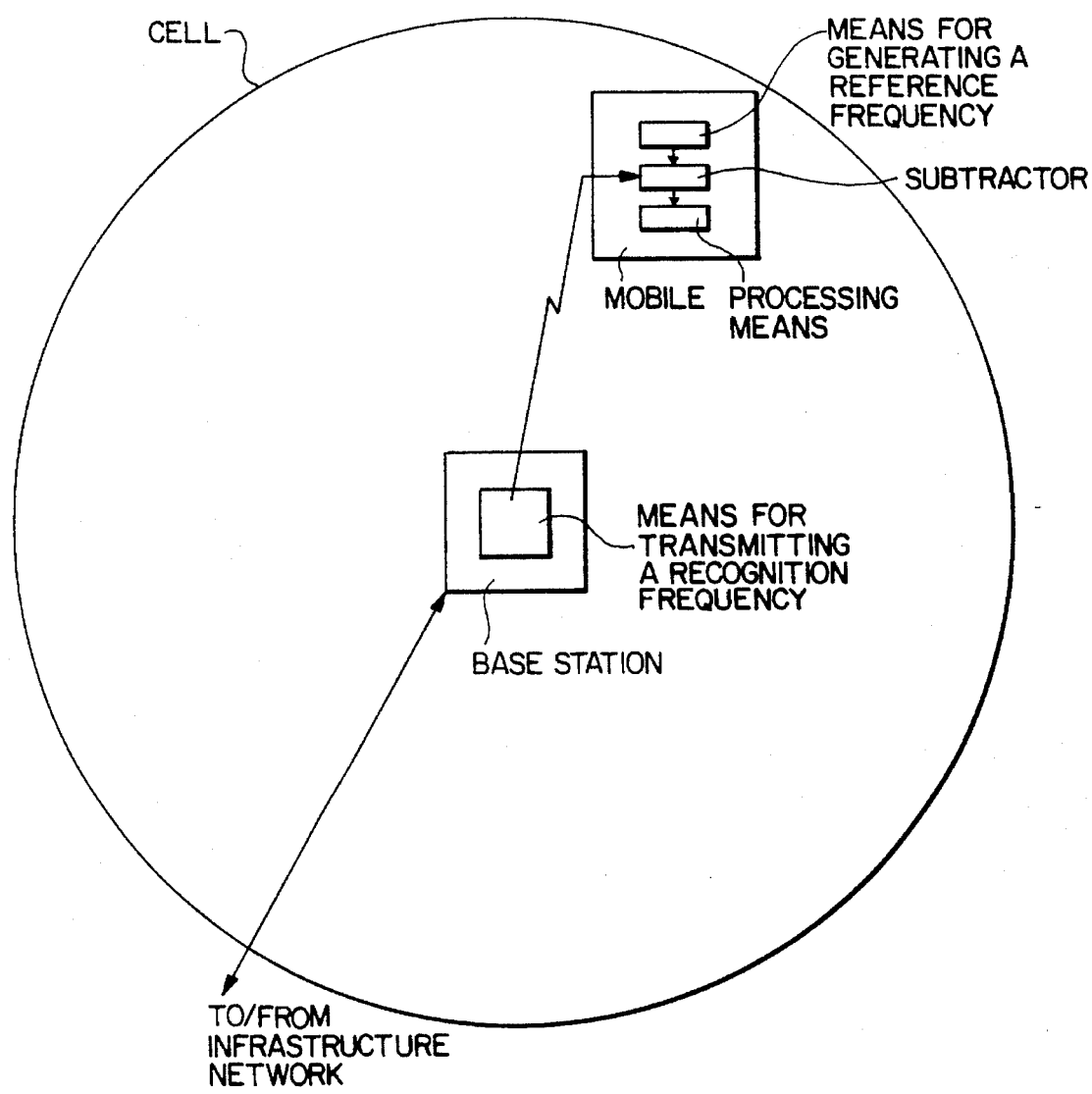
FIG. 1 depicts a mobile and base station according to the invention in a cell of a cellular mobile radio system.

The frequency synchronization message used in most cellular mobile radio systems is one of the first signalling messages for which the mobile station looks. The invention thus enables the mobile station to determine the characteristics of the cell it is accessing before any other operation requiring a knowledge of these characteristics.

The recognition message can be sent by the base transceiver station of the cell, for example. The reference frequency is preferably the broadcast control channel frequency of the cell (the broadcast control channel frequency carries signalling messages, amongst other signals).

In cellular mobile radio systems the mobile station is conventionally able to determine the broadcast control channel frequency of the cell it is accessing from the frequency synchronization message (how this is done is explained below).

In one embodiment of the invention, if the modulation applied by the network to the recognition message before it is transmitted in the form of a sinusoid is of the GMSK (Gaussian Minimum Shift Keying) type, the message prior to modulation comprises a sequence of bits which are all equal; in the case of differential coding GMSK modulation, this is either a sequence of bits all at binary zero or a sequence of alternating bits.

It is well known that GMSK modulation of such sequences produces a sinusoid.

In a GSM type system the frequency synchronization message can be an FCB (Frequency Correction Burst) transmitted on the FCCH (Frequency Correction CHannel).

This burst, which among other things constitutes the frequency synchronization message, and is also used subsequently to correct the frequency of the internal oscillator of the mobile station, comprises a sequence of bits all at binary zero.

If the cell types differ in respect of their bit rate or symbol rate, the difference between the reference frequency and the recognition frequency is advantageously proportional to this rate.

A mobile station for implementing the method of the invention (see FIG. 1) comprises means for determining the difference between the reference frequency and the recognition frequency and means for deducing therefrom the type of cell associated with this difference.

A base transceiver station for implementing the method of the invention comprises means for transmitting a different recognition message for each type of cell (see FIG. 1).

Other features and advantages of the present invention will emerge from the following description of embodiments of the invention given by way of non-limiting example only.

A GSM type system using GMSK modulation will serve as one example of a mobile radio system using more than one type of cell. In this system there are three types of cell: picocells, microcells and macrocells.

The three types of cell differ in terms of the symbol rate employed (because GSMK modulation is used, the symbol rate is equal to the bit rate in this example). The symbol rate of the picocells and microcells is 1 800 kilosymbols per second (ksymb/s); that of the macrocells is 450 ksymb/s.

The microcells can differ from the picocells in terms of the modulation, the coding, the burst structure or the baseband signal processing that they employ, for example.

In cellular systems in general each mobile station accesses (or is assigned to) a specific cell to exchange data (signalling or user data) with the system management network in the form of bursts and through the intermediary of the base transceiver station of the cell.

In systems with one or more types of cell, to access the base transceiver station of a cell the mobile station has to identify the frequency synchronization message in order to determine the broadcast control channel frequency of the cell and synchronize to this frequency. In the case of a GSM type system the frequency synchronization message is the FCB transmitted on the FCCH.

The FCB is also used, subsequently, to correct the frequency of the internal oscillator of the mobile station modulator.

In most known cellular mobile radio systems with one or more types of cell there exists a signalling message comprising a burst which when modulated generates a pure sinusoid. This message is usually the frequency synchronization message.

Thus in GSM type systems with one or more types of cell, such as the system used as an example in this description, the FCB comprises a series of bits all at binary zero. This system uses GMSK modulation and this modulation of a sequence of bits all at binary zero generates a pure sinusoid whose frequency $f_s$ is given by the equation $f_s = f_b + D/4$, where $f_b$ is the broadcast control channel frequency and D is the symbol rate used.

To determine the broadcast control channel frequency of the cell in which it is located the mobile station conventionally looks for the FCB, i.e. it looks for a sinusoid around a frequency having the following two characteristics: firstly, it belongs to a finite set containing the broadcast control channel frequencies of the cells in the area in which the mobile station is located (the mobile station always knows this set of frequencies) and, secondly, it is the frequency received at the highest level by the mobile station.

The FCCH frequency on which the FCB is transmitted is different from the broadcast control channel frequency, as already mentioned. The mobile station must therefore look for the FCB not on the broadcast control channel frequencies of the previously mentioned finite set, but rather in a predetermined range centered on each broadcast control channel frequency. The mobile station knows the center frequency associated with each range and is therefore capable of determining the broadcast control channel frequency of the cell in which it is located from the range in which it has found a sinusoid.

The invention exploits the properties of the FCB (or of equivalent messages in other cellular systems), namely:

its transformation by modulation into a pure sinusoid, the proportional relationship between the difference ($f_s - f_b$) and the symbol rate used, which is in turn proportional to the bit rate.

In the chosen example these properties enable use of the FCB as a recognition message to tell a mobile station in a system with more than one type of cell which type of cell it is accessing.

To this end, the mobile station begins by carrying out the usual procedure described above to determine the broadcast control channel frequency (it does not need to know the bit rate used by the cell for this, just the broadcast control channel frequency associated with each searched range).

To optimize this procedure if there is a finite number of cell types, for example (in the specific example chosen) a finite number of different bit rates, it is possible for the mobile station to look for the FCB not continuously throughout a range centered on each broadcast control channel frequency but rather around discrete points within this range which correspond, given the possible bit rates, to the possible carrier frequencies of the FCCH, i.e. to the possible recognition frequencies.

As already mentioned, this procedure necessarily comprises in all cases a stage of determining the FCCH carrier frequency.

It is then sufficient for the mobile station to calculate the difference between the FCCH carrier frequency (recognition frequency) and the broadcast control channel frequency (reference frequency) to determine which type of cell it is accessing. Thus information already available in existing systems is used.

In the example chosen, the difference ($f_s - f_b$) is equal to 450 kHz for the picocells and the microcells and to 112.5 kHz for the macrocells.

Calculating the difference between the reference frequency and the recognition frequency does not require any modification to the hardware of the mobile station.

In the conventional use of the FCB for frequency correction the mobile station must calculate the difference between the frequency on which its internal oscillator finds the FCCH, i.e. the frequency of the FCB sinusoid, and the frequency on which it should find it (remember that at this stage the mobile station knows the bit rate used and can therefore deduce from the FCB sinusoid frequency the frequency to which it should retune).

The mobile station therefore includes means for carrying out these operations, with the result that implementation of the invention does not pose any problem.

To exploit the difference determined in this way by the mobile station the software controlling the mobile station must be modified to calculate the difference ($f_s-f_b$) before any other operation and to provide in the mobile station a table of correspondence between the differences ($f_s-f_b$) and the symbol rates (or, more generally, an algorithm for determining the cell type from this difference).

The modifications required by the invention are obviously simple and therefore low-cost software modifications.

Note that, in the chosen example using GMSK modulation, if two types of cell have the same bit rate, and therefore differ in terms of some other characteristic, they cannot be distinguished by the mobile station using the FCB since the sinusoid has the same frequency if the bit rates are equal.

In this case, the conventional FCB for the picocells, for example, can be replaced by a burst comprising a sequence of bits all at binary one. In this case a sinusoid is still produced after GMSK modulation but its frequency $f_s$ is given by the equation: $f_s=f_b-D/4$.

If the modulation is differential coding GMSK modulation, the conventional FCB is replaced with a burst comprising an alternating sequence 01010101 . . . . This produces after modulation a sinusoid of frequency $f_s$.

In these situations the procedure is slightly modified at network level, as a modified FCB is used.

The method of the invention is, with great advantage, not affected by frequency drift affecting the mobile station oscillator. The maximum permissible drift is usually around $10^{-6}$ times the carrier frequency.

For a broadcast control channel frequency of 2 GHz, for example, the maximal drift is therefore 2 kHz. Given the value of the differences concerned (in the order of 100 kHz), this is negligible and does not disrupt the measurements.

As for the influence of the Doppler effect, the frequency shift at a speed of 500 kph (when the mobile station is on board a high-speed train, for example) is 926 Hz.

The total frequency drift (oscillator frequency drift+Doppler shift) is therefore around 3 kHz, which has a negligible effect on the measurements.

Other types of imperfection causing frequency drift do not cause disturbances prejudicial to the measurements either.

Generally speaking, the difference between the differences characteristic of any two types of cells must be sufficient to avoid any ambiguity due to frequency drift of the local oscillator or to the Doppler shift at the mobile station.

The only two types of sequence which can produce sinusoids in the event of GMSK modulation have just been described.

If the cell types differ in terms of their bit rate (or symbol rate) GMSK modulation, whether differential coding is used or not, is entirely suitable. It has been shown that if two cell types have the same bit rate they can still be distinguished using GMSK type modulation by using the second sequence to generate a sinusoid (i.e. by reversing the direction of rotation of the modulation). If more than two cell types (or all the cell types) have the same bit rate, it is no longer possible to use GMSK type modulation to determine the cell type.

However, it always possible to find a type of modulation producing a sufficient number of sequences generating sinusoids to enable all types of cell to be distinguished.

In the case of QAM modulation, for example, the four modulation symbols are 00 ($S_1$), 01 ($S_2$), 11 ($S_3$) and 10 ($S_4$).

A sequence comprising a series of identical symbols generates a sinusoid having a frequency equal to the reference frequency (in the case of the FCCH this frequency is the broadcast control channel frequency).

A sequence comprising the series $S_1$, $S_2$, $S_3$ and $S_4$ generates a sinusoid whose frequency differs from the broadcast control channel frequency by D/4, where D is again the symbol rate.

A sequence comprising the alternation $S_1$, $S_3$ or $S_2$, $S_4$ generates a sinusoid whose frequency differs from the broadcast control channel frequency by D/2.

Finally, a sequence comprising the series $S_1$, $S_4$, $S_3$, $S_2$ generates a sinusoid whose frequency differs from the broadcast control channel frequency by $-D/4$.

It is thus possible to recognize four types of cell having the same bit rate and differing in terms of one or more characteristics.

Of course, the invention is not limited to the embodiment just described.

Firstly, as shown by the second example of modulation, the method of the invention is independent of the type of modulation employed. What is essential to the invention is the use of a message in the form of a sinusoid. A sinusoid of this kind can be processed by the mobile station when the latter does not know the characteristics of the cell it is accessing.

The recognition message therefore need not necessarily comprise a frequency synchronization message.

When the recognition message is a frequency synchronization message and when the reference frequency is the broadcast control channel frequency, the difference between the reference frequency and the recognition frequency must be such that the recognition frequency is always within a predetermined range around the reference frequency which is known to the mobile station, so that the latter can determine the reference frequency.

The modulation is usually chosen so that there is, for each type of cell, a different sequence causing the transmission of a sinusoid whose frequency is such that the difference between it and the reference frequency is characteristic of the cell type.

Moreover, it is not necessary for the reference frequency to be the broadcast control channel frequency. It can be any other frequency known in advance by the mobile station or that the mobile station can determine.

Nor is it necessary for the reference frequency processed by the mobile station to determine the frequency difference to be the carrier frequency of the recognition message.

The method of the invention can be used in any cellular mobile radio system with more than one type of cell and with great advantage in relation to multimode terminals capable of operating in complex systems comprising a plurality of simple cellular mobile radio systems.

Finally, any means as described hereinabove can be replaced by equivalent means without departing from the scope of the invention.

There is claimed:

1. A method of determining, in a cellular mobile radio system with more than one type of cell, which type of cell a mobile station is accessing, said method including the steps of:

transmitting a signalling message that defines a recognition message from a base station of said mobile radio system to said mobile station, wherein said signalling message is in the form of a sinusoid having a frequency which (1) defines a recognition frequency, and (2) differs from a reference frequency that is known to or determinable by said mobile station, the difference between said reference frequency and said recognition frequency being characteristic of the cell type, determining, by said mobile station, said recognition frequency, calculating, by said mobile station, the difference between said reference frequency and said recognition frequency, basing a determination by said mobile station, as to the cell type, on said difference.

2. The method according to claim 1, wherein, in said transmitting step, said recognition message is contained in a frequency synchronization message transmitted by said base station to said mobile station to enable said mobile station to synchronize its frequency to a broadcast control channel frequency emitted by said base station.

3. The method according to claim 1 wherein said reference frequency is a broadcast control channel frequency emitted from said base station.

4. The method according to claim 1, wherein said base station emitting said recognition message is a base station defining a cell to which said mobile station belongs.

5. The method according to claim 1, further comprising the steps of:

applying a modulation, by said base station, to said recognition message before said transmission step, to form a sinusoid of the GMSK type, and forming said recognition message, prior to said applying step, of a sequence of equal bits.

6. The method according to claim 1, further comprising the steps of:

applying a modulation, by said base station, to said recognition message before said transmission step, to form a sinusoid of the differential coding GMSK type, and forming said recognition message, prior to said applying step, of a sequence of bits, said sequence of bits being one of (1) bits which are all equal to binary zero, and (2) an alternating sequence of bits.

7. The method according to claim 1, wherein said cellular radio mobile system is a GSM type system, and said recognition message is a Frequency Control Burst (FCB) transmitted on a Frequency Control CHannel (FCCH).

8. The method according to claim 1, wherein said system comprises different cell types which differ therebetween as having respective bit rates or associated symbol rates, and said difference determined by said mobile station is proportional to said bit rate of said type cell.

9. A mobil station in a cellular mobile radio system said cellular mobile radio system having more than one type of cell, said mobile station comprising:

means for receiving from a base station a signalling message (recognition message) in the form of a sinusoid whose frequency (recognition frequency) differs from a reference frequency known to or determinable by said mobile station;

means for determining a difference between said reference frequency and said recognition frequency;

means for determining the cell type of a cell to which belongs said mobile station as a function of said difference.

10. The mobile station according to claim 9, wherein said recognition message is contained in a frequency synchronization message transmitted by said base station to said mobile station to enable it to synchronize its frequency to a broadcast control channel frequency emitted by said base station.

11. The mobile station according to claim 9, wherein said reference frequency is a broadcast control channel frequency received from said base station.

12. The mobile station according to claim 9, wherein said base station emitting said recognition message defines a cell to which said mobile station belongs.

13. The mobile station according to claim 9, wherein said received recognition message is in the form of a sinusoid being of the GMSK type resulting from a modulation by said base station of a sequence of equal bits.

14. The mobile station according to claim 9, wherein said received recognition message is in the form of a sinusoid being of the differential coding GMSK type resulting from a modulation by said base station of a sequence of bits, said sequence of bits being one of (1) bits which are all equal to binary zero, and (2) an alternative sequence of bits.

15. The mobile station according to claim 9, wherein said cellular radio mobile system is a GSM type system, and said recognition message is a Frequency Control Burst (FCB) received on a Frequeny Control CHannel (FCCH).

16. The mobile station according to claim 9, wherein said system comprises different cell types which differ therebetween as having respective bit rates or associated symbol rates, and said difference determined by said mobile station is proportional to said bit rate of said type cell.

17. A base station of a cellular mobile radio system with more than one type of cell, each said cell having a cell type, said base station comprising:

means for transmitting a reference frequency which is a broadcast control channel frequency and a signalling message (recognition message) in the form of a sinusoid having a frequency which (1) defines a recognition frequency and (2) identifies said cell type of a cell to which said base station belong, said recognition frequency being different from one type of cell to another.

18. The base station according to claim 17, wherein said transmitted recognition message is in the form of a sinusoid being of the GMSK type resulting from a modulation by said base station of a sequence of equal bits.

19. The base station according to claim 17, wherein said transmitted recognition message is in the form of a sinusoid being of the differential coding GMSK type requlting from a modulation by said base station of a sequence of bits, said sequence of bits being one of (1) bits which are all equal to binary zero, and (2) an alternative sequence of bits.

20. The base station according to claim 17, wherein said cellular radio mobile system is a GSM type system, and said recognition message is a Frequency Control Burst (FCB) transmitted on a Frequency Control CHannel (FCCH).

* * * * *